US012631846B2

(12) United States Patent
Misener et al.

(10) Patent No.: US 12,631,846 B2
(45) Date of Patent: **\*May 19, 2026**

(54) FLOW CYTOMETER, LASER OPTICS ASSEMBLY THEREOF, AND METHODS OF ASSEMBLING THE SAME

(71) Applicant: IDEXX Laboratories Inc., Westbrook, ME (US)

(72) Inventors: Garland Christian Misener, Portland, ME (US); Michael Ryan Moon, Scarborough, ME (US); Spencer Franklin McElwain, Portland, ME (US); Alan Papale, Saco, ME (US)

(73) Assignee: IDEXX LABORATORIES, INC., Westbrook, ME (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/203,169

(22) Filed: May 30, 2023

(65) Prior Publication Data

US 2023/0305262 A1　Sep. 28, 2023

Related U.S. Application Data

(63) Continuation of application No. 17/146,808, filed on Jan. 12, 2021, now Pat. No. 11,662,542, which is a
(Continued)

(51) Int. Cl.
*G02B 7/02* (2021.01)
*G01N 15/0205* (2024.01)
(Continued)

(52) U.S. Cl.
CPC ......... *G02B 7/021* (2013.01); *G01N 15/0205* (2013.01); *G01N 15/14* (2013.01);
(Continued)

(58) Field of Classification Search
CPC ........... G01N 15/1434; G01N 15/1459; G01N 15/1452; G01N 15/1404; G01N 15/12;
(Continued)

(56) References Cited

U.S. PATENT DOCUMENTS

| | | | |
|---|---|---|---|
| 3,925,018 A | 12/1975 | Saunders | |
| 4,013,368 A | 3/1977 | Acker et al. | |

(Continued)

FOREIGN PATENT DOCUMENTS

| | | | |
|---|---|---|---|
| CN | 102334021 A | 1/2012 | |
| CN | 102608671 A | 7/2012 | |

(Continued)

OTHER PUBLICATIONS

First Office Action issued in corresponding Chinese Application No. 201980023244.2 dated Nov. 23, 2021, 13 pages.
(Continued)

*Primary Examiner* — Michelle M Iacoletti
*Assistant Examiner* — Noah J. Haney
(74) *Attorney, Agent, or Firm* — Carter, DeLuca & Farrell LLP

(57) ABSTRACT

A flow cytometer, laser optics assembly thereof, and methods of assembling the same are provided. The flow cytometer is capable of yielding consistent and accurate results despite exposure to adverse environmental conditions such as, for example, temperature changes within a relatively wide temperature range and/or a relatively large amount of random-axis mechanical vibration. The flow cytometer of the present disclosure is additionally or alternatively relatively insensitive to real or apparent core stream shifts, employs a slowly converging beam along the axis perpendicular to core stream flow, and provides the ability to precisely measure time-of-flight.

18 Claims, 8 Drawing Sheets

Related U.S. Application Data continuation of application No. 16/367,816, filed on Mar. 28, 2019, now Pat. No. 10,914,913.

(60) Provisional application No. 62/650,783, filed on Mar. 30, 2018.

(51) Int. Cl.

| | |
|---|---|
| *G01N 15/14* | (2024.01) |
| *G01N 15/1434* | (2024.01) |
| *G02B 19/00* | (2006.01) |
| *G02B 27/09* | (2006.01) |
| *G02B 27/30* | (2006.01) |

(52) U.S. Cl.
CPC ..... *G01N 15/1434* (2013.01); *G02B 19/0052* (2013.01); *G02B 27/0966* (2013.01); *G02B 27/30* (2013.01); *G01N 2015/1493* (2013.01)

(58) Field of Classification Search
CPC ....... G01N 15/0205; G01N 2021/4707; G01N 2201/0612; G01N 2015/149; G01N 2015/1006; G01N 2015/1493; G01N 2015/1486; G01N 15/14; G01N 21/05; G01N 2021/052; G01N 2021/054; G01N 2021/056; G01N 2021/058; G01N 21/07; G01N 21/09; G02B 7/021; G02B 27/30; G02B 19/0052; G02B 27/0966
USPC ..... 356/335–343, 73, 440; 422/82.05, 82.09, 422/82.08
See application file for complete search history.

(56) References Cited

U.S. PATENT DOCUMENTS

| | | | |
|---|---|---|---|
| 4,043,669 | A | 8/1977 | Gehatia et al. |
| 4,250,394 | A | 2/1981 | O'Connor |
| 4,284,412 | A | 8/1981 | Hansen et al. |
| 4,565,448 | A | 1/1986 | Abbott et al. |
| 4,606,636 | A | 8/1986 | Monin et al. |
| 4,665,553 | A | 5/1987 | Gershman et al. |
| 4,818,103 | A | 4/1989 | Thomas et al. |
| 4,954,715 | A | 9/1990 | Zold |
| 4,989,977 | A | 2/1991 | North, Jr. |
| 5,017,497 | A | 5/1991 | Grooth et al. |
| 5,093,234 | A | 3/1992 | Schwartz et al. |
| 5,125,737 | A | 6/1992 | Rodriguez et al. |
| 5,155,044 | A | 10/1992 | Ledis et al. |
| 5,179,026 | A | 1/1993 | Matsuda et al. |
| 5,255,015 | A | 10/1993 | Noethen et al. |
| 5,264,369 | A | 11/1993 | Sakata et al. |
| 5,284,771 | A | 2/1994 | Fan et al. |
| 5,308,772 | A | 5/1994 | Sakata et al. |
| 5,350,695 | A | 9/1994 | Colella et al. |
| 5,360,739 | A | 11/1994 | Fan et al. |
| 5,369,631 | A | 11/1994 | Hwang |
| 5,386,287 | A | 1/1995 | Berssen et al. |
| 5,408,307 | A | 4/1995 | Yamamoto et al. |
| 5,411,891 | A | 5/1995 | Fan et al. |
| 5,432,601 | A | 7/1995 | Tanaka et al. |
| 5,438,003 | A | 8/1995 | Colella et al. |
| 5,451,525 | A | 9/1995 | Shenkin et al. |
| 5,467,189 | A | 11/1995 | Kreikebaum et al. |
| 5,475,487 | A | 12/1995 | Mariella, Jr. et al. |
| 5,492,833 | A | 2/1996 | Rodriguez et al. |
| 5,510,267 | A | 4/1996 | Marshall |
| 5,540,494 | A | 7/1996 | Purvis, Jr. et al. |
| 5,558,998 | A | 9/1996 | Hammond et al. |
| 5,585,246 | A | 12/1996 | Dubrow et al. |
| 5,616,501 | A | 4/1997 | Rodriguez et al. |
| 5,627,037 | A | 5/1997 | Ward et al. |
| 5,631,165 | A | 5/1997 | Chupp et al. |
| 5,650,847 | A | 7/1997 | Maltsev et al. |
| 5,691,204 | A | 11/1997 | Kim et al. |
| 5,728,351 | A | 3/1998 | Carver, Jr. |
| 5,728,582 | A | 3/1998 | Taki et al. |
| 5,733,784 | A | 3/1998 | Studholme et al. |
| 5,737,078 | A | 4/1998 | Takarada et al. |
| 5,747,343 | A | 5/1998 | Tsuchiya et al. |
| 5,753,186 | A | 5/1998 | Hanley et al. |
| 5,798,827 | A | 8/1998 | Frank et al. |
| 5,858,667 | A | 1/1999 | Dertinger et al. |
| 5,872,627 | A | 2/1999 | Miers |
| 5,874,310 | A | 2/1999 | Li et al. |
| 5,874,311 | A | 2/1999 | Li et al. |
| 5,891,733 | A | 4/1999 | Inoue |
| 5,917,584 | A | 6/1999 | Li et al. |
| 5,939,326 | A | 8/1999 | Chupp et al. |
| 5,940,177 | A | 8/1999 | Esser et al. |
| 6,067,157 | A | 5/2000 | Altendorf |
| 6,074,879 | A | 6/2000 | Zelmanovic et al. |
| 6,228,652 | B1 | 5/2001 | Rodriguez et al. |
| 6,232,125 | B1 | 5/2001 | Deka et al. |
| 6,261,519 | B1 | 7/2001 | Harding et al. |
| 6,271,035 | B1 | 8/2001 | Deka et al. |
| 6,320,656 | B1 | 11/2001 | Ferrante et al. |
| 6,365,106 | B1 | 4/2002 | Nagai |
| 6,410,337 | B1 | 6/2002 | Brady et al. |
| 6,612,719 | B2 | 9/2003 | Richardson et al. |
| 6,713,019 | B2 | 3/2004 | Ozasa et al. |
| 7,053,783 | B2 | 5/2006 | Hamburger et al. |
| 7,064,823 | B2 | 6/2006 | Roche et al. |
| 7,110,192 | B2 | 9/2006 | Sauter et al. |
| 7,215,425 | B2 | 5/2007 | Rezachek et al. |
| 7,324,194 | B2 | 1/2008 | Roche et al. |
| 7,385,682 | B2 | 6/2008 | Chu et al. |
| 7,561,267 | B2 | 7/2009 | Luo et al. |
| 7,787,197 | B2 | 8/2010 | Chen |
| 7,800,742 | B2 | 9/2010 | Fukuda et al. |
| 7,876,436 | B2 | 1/2011 | Chu |
| 8,366,298 | B2 | 2/2013 | Misener et al. |
| 8,619,370 | B2 | 12/2013 | Hunter et al. |
| 9,372,143 | B2 | 6/2016 | Yamamoto et al. |
| 9,523,857 | B2 | 12/2016 | Heanue et al. |
| 9,823,178 | B2 | 11/2017 | Fujiwara et al. |
| 10,914,913 | B2 | 2/2021 | Misener et al. |
| 11,215,545 | B2 * | 1/2022 | Shi ..................... G01N 15/1459 |
| 11,543,342 | B2 | 1/2023 | Misener |
| 11,662,542 | B2 | 5/2023 | Misener et al. |
| 11,879,828 | B2 * | 1/2024 | Misener .............. G02B 5/3083 |
| 2002/0141902 | A1 | 10/2002 | Ozasa et al. |
| 2003/0030783 | A1 | 2/2003 | Roche et al. |
| 2004/0036874 | A1 * | 2/2004 | Kramer .................. G01N 21/51 |
| | | | 356/342 |
| 2005/0040324 | A1 | 2/2005 | Kobayashi |
| 2005/0151967 | A1 | 7/2005 | Kusuzawa |
| 2008/0019011 | A1 | 1/2008 | Krneta et al. |
| 2008/0186490 | A1 * | 8/2008 | Chu .................. G01N 15/1434 |
| | | | 362/257 |
| 2009/0079981 | A1 | 3/2009 | Holve |
| 2009/0316151 | A1 | 12/2009 | Matula et al. |
| 2010/0220315 | A1 * | 9/2010 | Morrell .............. G01N 15/1436 |
| | | | 356/73 |
| 2012/0105967 | A1 | 5/2012 | Hunter |
| 2013/0020498 | A1 | 1/2013 | Ebi et al. |
| 2014/0234865 | A1 | 8/2014 | Gabriel |
| 2014/0285900 | A1 | 9/2014 | Grapov |
| 2015/0077869 | A1 | 3/2015 | Meng et al. |
| 2015/0115174 | A1 * | 4/2015 | Chen .................. F04B 11/0025 |
| | | | 250/216 |
| 2016/0025611 | A1 * | 1/2016 | Fujiwara .................. G02B 3/06 |
| | | | 356/338 |
| 2017/0102314 | A1 | 4/2017 | Diebold et al. |
| 2017/0198782 | A1 | 7/2017 | Rowlen et al. |
| 2019/0302391 | A1 | 10/2019 | Misener et al. |
| 2021/0396646 | A1 * | 12/2021 | Misener ............. G01N 15/1434 |

FOREIGN PATENT DOCUMENTS

| | | |
|---|---|---|
| CN | 102998239 A | 3/2013 |
| CN | 103278908 A | 9/2013 |
| CN | 104068826 A | 10/2014 |

(56)          References Cited

FOREIGN PATENT DOCUMENTS

| CN | 105339777 A | 2/2016 |
|----|-------------|--------|
| CN | 106707449 A | 5/2017 |
| CN | 106796170 A | 5/2017 |
| EP | 0887637 A2 | 12/1998 |
| EP | 1245944 A2 | 10/2002 |
| JP | S6338356 B2 | 7/1988 |
| JP | H03197841 A | 8/1991 |
| JP | H05234125 A | 9/1993 |
| JP | H067198 A | 1/1994 |
| JP | H1090164 A | 4/1998 |
| JP | 2002-296170 A | 10/2002 |
| JP | 2003-004625 A | 1/2003 |
| JP | 2009103687 A | 5/2009 |
| JP | 2016024093 A | 2/2016 |
| JP | 2016524703 A | 8/2016 |
| JP | 2021-519432 A | 8/2021 |
| WO | 2019191419 A2 | 10/2019 |

OTHER PUBLICATIONS

Office Action issued in corresponding Canadian Application No. 3,094,373 dated Sep. 24, 2021, 4 pages.
Vogt, Jr. et al., "Model System Evaluating Fluorescein-Labeled Microbeads as Internal Standards to Calibrate Fluorescence Intensity on FlowCytometers.sup. 1,2", Cytometry, 10:294-302 (1989).
Young Ran Kim et al., "Isovolumetric Sphering of Erythrocytes for More Accurate and Precise Cell Volume Measurement by Flow Cytometry.sup.1", Cytometry, vol. 3, No. 6, 419-427 (1983).
Supplemental Partial European Search Report issued in EP 01937695 completed Dec. 15, 2005, 2 pages.
International Search Report issued in PCT/US01/16814 dated Aug. 27, 2001, 2 pages.
Provisional Opinion Accompanying the Partial Search Report (Annex to Invitation to Pay Additional Fees) issued in corresponding International ApplicationNo. PCT/US2019/024568 dated Jul. 4, 2019, 12 pages.
International Search Report and Written Opinion issued in International Application No. PCT/US2019/024568 dated Oct. 16, 2019, 23 pages.
International Preliminary Report on Patentability and Written Opinion issued in International Application No. PCT/US2019/024568 dated Oct. 15, 2020, 16 pages.
Australian Examination Report issued in corresponding Australian Application No. 2019242902 dated Jan. 28, 2021, 4 pages.
Office Action issued in corresponding JP Patent Application No. 2020-552698, dated Dec. 21, 2021, pp. 1-6.
Office Action issued in corresponding CN Patent Application No. 201980023244.2 dated Jun. 15, 2022, pp. 1-5.
Notification for the Grant of Invention Patent Right and Notification for Completion of Formalities for Registration issued in corresponding CN Patent Application No. 201980023244.2 dated Sep. 15, 2022, pp. 1-7, together with English Translation.
Office Action issued in corresponding CA Patent Application No. 3,094,373 dated Aug. 3, 2022, pp. 1-4.
Australian Examination Report issued in corresponding Australian Application No. 2022200534 dated Feb. 16, 2023, 3 pages.
Notice of Reasons for Rejection issued by the Japanese Patent Office on Sep. 26, 2023 in corresponding JP Patent Application No. 2022-195472, with English translation.
Brazilian Office Action issued in corresponding BR Patent Application No. BR112020019247-3, dated Dec. 21, 2023, with partial English translation.
Notice of Reasons for Refusal issued by the Japanese Patent Office on Mar. 12, 2024 in corresponding JP Patent Application No. 2022-195472, with English translation.
Extended European Search Report issued by the European Patent Office on May 24, 2024 in corresponding EP Patent Application No. 24156554.8, pp. 1-8.
Examination Report No. 1 issued in corresponding AU Patent Application No. 2023286023, dated Mar. 3, 2025, pp. 1-3.
Chinese Office Action issued by the China National Intellectual Property Administration on Jul. 1, 2025 in corresponding CN Patent Application No. 202211535227.7, with English translation.
Watts, B. et al., "Formation and characterization of an ideal excitation beam geometry in an optofluidic device" Biomedical Optics Express (Sep. 2010) pp. 848-860, vol. 1, No. 3.
Office Action issued by the European Patent Office on Aug. 21, 2025 in corresponding EP Patent Application No. 24156554.8, pp. 1-7.

* cited by examiner

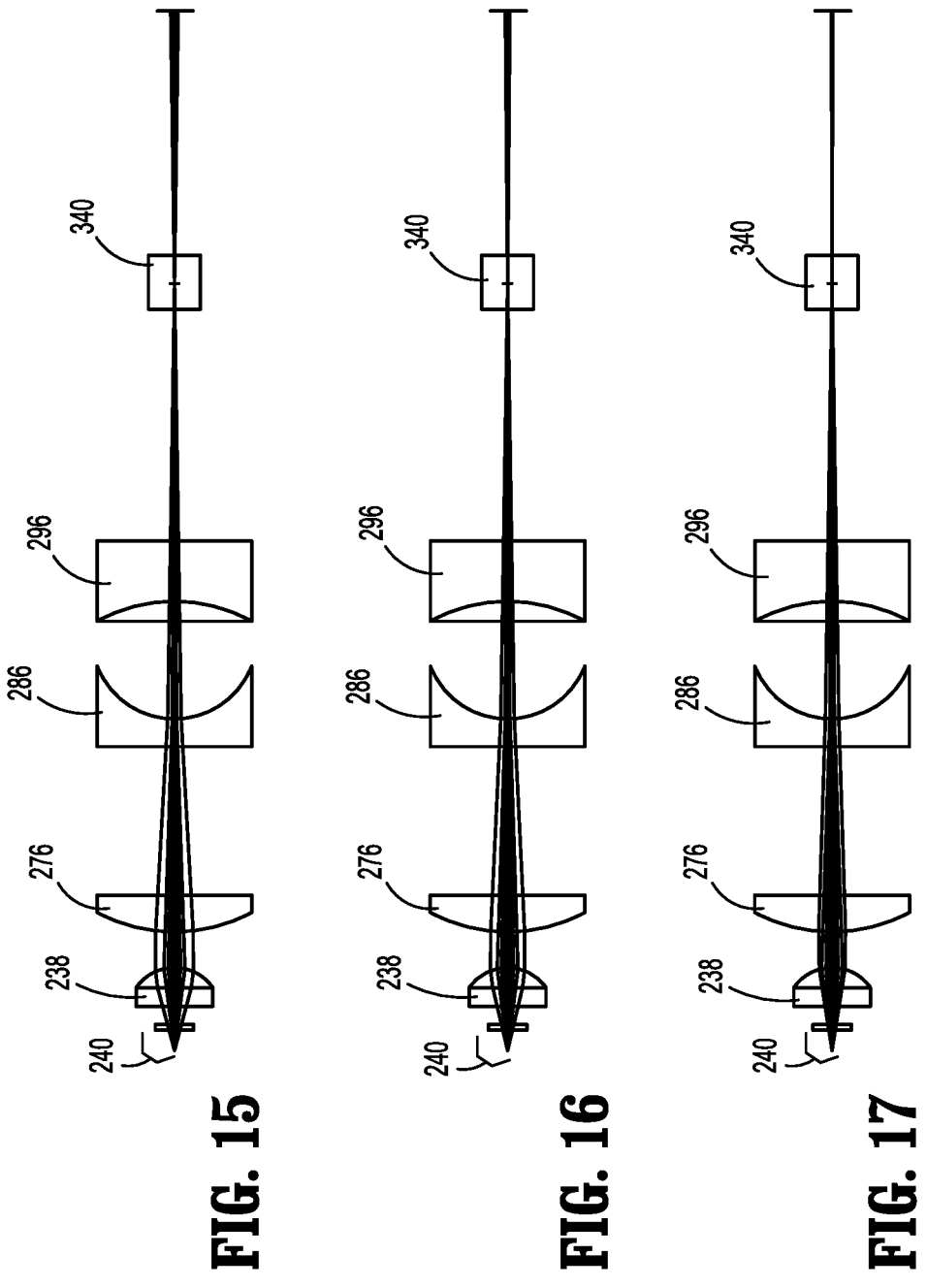

FLOW CYTOMETER, LASER OPTICS ASSEMBLY THEREOF, AND METHODS OF ASSEMBLING THE SAME

CROSS-REFERENCE TO RELATED APPLICATIONS

This application is a continuation of U.S. patent application Ser. No. 17/146,808, filed on Jan. 12, 2021 and now U.S. Pat. No. 11,662,542, which is a continuation of U.S. patent application Ser. No. 16/367,816, filed on Mar. 28, 2019 and now U.S. Pat. No. 10,914,913, which claims the benefit of and priority to U.S. Provisional Patent Application No. 62/650,783, titled "FLOW CYTOMETER, LASER OPTICS ASSEMBLY THEREOF, AND METHODS OF ASSEMBLING THE SAME" and filed on Mar. 30, 2018. The entire contents of each of the above-noted applications are hereby incorporated herein by reference.

BACKGROUND

Technical Field

The present disclosure relates to flow cytometry and, more particularly, to a flow cytometer, a laser optics assembly for a flow cytometer, and methods of assembling the same.

Background of Related Art

Flow cytometers typically require a laser beam to pass through a relatively narrow sample core stream such that particles flowing through the sample core stream are illuminated by the laser beam, absorbing and scattering the laser light in accordance with the refractive indices, sizes, shapes, and other properties of the particles. For each particle, the light intensities absorbed and scattered are measured. The absorption and scattering measurements are used to identify and quantify particle types and particle characteristics. More recently, time-of-flight measurements have been additionally or alternatively utilized to determine particle types and/or characteristics.

As can be appreciated, in order to maintain accurate performance, a flow cytometer must perform consistently from test to test. One way to ensure consistency is to eliminate as many environmental factors as possible, e.g., temperature changes, mechanical vibrations, etc., and/or to continuously calibrate the flow cytometer to ensure that environmental factors and/or other variables are not effecting performance. However, while this may be a practical solution in a precision laboratory, it is not practical in many other settings such as, for example, in a practitioner's office or out in the field.

It would therefore be desirable to provide a flow cytometer and laser optics assembly thereof that are capable of withstanding adverse environmental conditions and are relatively insensitive to other variables, such that the flow cytometer and laser optics assembly yield consistent and accurate results without requiring repeated alignment and/or calibration. Methods of assembling the same would also be desirable.

SUMMARY

The present disclosure provides a flow cytometer and laser optics assembly thereof capable of yielding consistent and accurate results despite exposure to adverse environ-mental conditions such as, for example, temperature changes within a relatively wide temperature range and/or a relatively large amount of random-axis mechanical vibration. The flow cytometer of the present disclosure is also relatively insensitive to real or apparent core stream shifts, operates without the need for a beam stopper, employs a slowly converging beam along the axis perpendicular to core stream flow, and provides the ability to precisely measure time-of-flight. Methods of assembling the flow cytometer and laser optics assembly are also provided. These and other aspects and features of the present disclosure are detailed below. To the extent consistent, any of the aspects and features detailed herein may be utilized with or without any of the other aspects and features detailed herein, regardless of whether such aspects and features are described together or separately hereinbelow.

Provided in accordance with aspects of the present disclosure is a laser optics assembly of a flow cytometer including a base plate defining a barrel, a collimation assembly at least partially disposed within the barrel, a first lens at least partially disposed within the barrel, a second lens at least partially disposed within the barrel, and a third lens at least partially disposed within the barrel. The collimation assembly, the first lens, the second lens, and the third lens are secured relative to the base plate to withstand 10 G's of random-axis mechanical vibration for at least 30 seconds without effecting movement of the collimation assembly, the first lens, the second lens, or the third lens relative to the base plate.

In an aspect of the present disclosure, at least one cover plate secures the collimation assembly, the first lens, the second lens, and the third lens relative to the base plate. The at least one cover plate may be bolted to the base plate.

In another aspect of the present disclosure, a separate cover plate secures each of the collimation assembly, the first lens, the second lens, and the third lens relative to the base plate. Each of the cover plates may be bolted to the base plate.

In still another aspect of the present disclosure, the collimation assembly includes a laser diode and a collimation lens disposed in alignment with the laser diode.

In yet another aspect of the present disclosure, the barrel of the base plate defines a first chamber configured to at least partially receive the collimation assembly, a second chamber configured to at least partially receive the first lens, a third chamber configured to at least partially receive the second lens, and a fourth chamber configured to at least partially receive the third lens.

In still yet another aspect of the present disclosure, the first, second, and third lenses are secured within respective first, second, and third lens cradles at least partially disposed within the second, third, and fourth chambers of the barrel of the base plate, respectively.

In another aspect of the present disclosure, at least one of the first, second, or third lens cradles includes a finger extending therefrom configured to permit rotational adjustment of the lens cradle within the corresponding chamber during assembly. At least one of the first, second, or third lens cradles may include a finger extending therefrom configured to permit axial adjustment of the lens cradle within the corresponding chamber during assembly. Additionally or alternatively, at least one of the first, second, or third lens cradles may include a finger extending therefrom configured to permit both rotational and axial adjustment of the lens cradle within the corresponding chamber during assembly.

In yet another aspect of the present disclosure, the first lens is a positive cylindrical lens, the second lens is a negative cylindrical lens, and the third lens is a cylindrical objective lens. The first, second, and third lens, in such aspects, may be arranged in order along the barrel extending from the collimation assembly.

A flow cytometer provided in accordance with aspects of the present disclosure includes a lens sub-assembly including a plurality of lenses arranged along an axis, a flow cell positioned down-axis from the lens sub-assembly, and a collimation sub-assembly positioned up-axis from the lens sub-assembly. The collimation sub-assembly includes a laser diode configured to emit a beam, a collimating lens configured to collimate the beam, and at least two supports configured to maintain a prescribed axial distance between the laser diode and the collimating lens. The at least two supports are formed from materials having coefficients of thermal expansion that balance each other such that the prescribed axial distance is maintained through a temperature variation of up to 30° C.

In an aspect of the present disclosure, the temperature variation is from 10° C. to 40° C.

In another aspect of the present disclosure, the first support is formed from PEEK and the second support is formed from brass.

In still another aspect of the present disclosure, three supports configured to maintain the prescribed axial distance are formed from materials having coefficients of thermal expansion that balance each other. In such aspects, the first support may be formed from PEEK, the second support may be formed from brass, and the third support may be formed from aluminum.

In yet another aspect of the present disclosure, the flow cytometer further includes a mounting platform having the lens sub-assembly, the collimation sub-assembly, and a housing supporting the flow cell mounted thereon to maintain a prescribed axial distance between the flow cell and the lens sub-assembly. In such aspects, the housing and the mounting platform are formed from materials having coefficients of thermal expansion that balance each other such that the prescribed axial distance between the flow cell and the lens sub-assembly is maintained through a temperature variation of up to 30° C.

In still yet another aspect of the present disclosure, the housing is formed from a copolyester and the mounting platform is formed from aluminum.

A method of assembling a laser optics assembly of a flow cytometer provided in accordance with aspects of the present disclosure includes securing a collimation assembly at least partially within a barrel of a base plate. The collimation assembly includes a laser diode and a collimating lens configured to produce a laser beam along an axis, wherein the laser beam has a diametric beam $1/e^2$ waist in a first direction and a beam $1/e^2$ width in a second direction. The method further includes positioning a third lens at least partially within the barrel of the base plate on the axis, rotationally adjusting the third lens about the axis such that the diametric beam $1/e^2$ waist is minimized, securing the third lens relative to the base plate, positioning a first lens at least partially within the barrel of the base plate on the axis, rotationally adjusting the first lens about the axis such that the diametric beam $1/e^2$ waist is maintained, securing the first lens relative to the base plate, positioning a second lens at least partially within the barrel of the base plate on the axis, rotationally adjusting the second lens about the axis such that the diametric beam $1/e^2$ waist is maintained, axially adjusting the second lens along the axis such that the beam $1/e^2$ width is set at a desired value, and securing the second lens relative to the base plate.

In an aspect of the present disclosure, the third lens is positioned farthest from the collimation assembly, the first lens is positioned closest to the collimation assembly, and the second lens is positioned between the first and third lenses.

In another aspect of the present disclosure, the third lens is a cylindrical objective lens, the first lens is a positive cylindrical lens, and the second lens is a negative cylindrical lens.

In still another aspect of the present disclosure, the third lens is positioned within a third chamber of the barrel that is configured to axially constrain the third lens and permit rotation of the third lens prior to securing the third lens, the first lens is positioned within a first chamber of the barrel that is configured to axially constrain the first lens and permit rotation of the first lens prior to securing the first lens, and the second lens is positioned within a second chamber of the barrel that is configured to permit rotation and translation of the second lens prior to securing the second lens.

In yet another aspect of the present disclosure, the diametric beam $1/e^2$ waist is 6.7 μm to 9 μm.

In still yet another aspect of the present disclosure, the beam $1/e^2$ width is 190 μm to 210 μm. More specifically, the beam $1/e^2$ width may be 200 μm.

Another flow cytometer provided in accordance with aspects of the present disclosure includes a flow cell defining a flow direction, a collimation assembly including laser diode and a collimating lens configured to produce a laser beam along an axis, a positive cylindrical lens disposed on the axis and configured to receive the laser beam from the collimation assembly, a negative cylindrical lens disposed on the axis and configured to receive the laser beam from the positive cylindrical lens, a cylindrical objective lens disposed on the axis and configured to receive the laser beam from the negative cylindrical lens and project the laser beam onto the flow cell such that the laser beam incident on the flow cell defines a diametric beam $1/e^2$ waist in a direction parallel to the flow direction of the flow cell of 6.7 μm to 9 μm and a beam $1/e^2$ width in a direction perpendicular to the flow direction of the flow cell of 190 μm to 210 μm.

In an aspect of the present disclosure, the diametric beam $1/e^2$ waist and beam $1/e^2$ width are selected such that performance is not degraded despite an actual radial core stream shift within the flow cell of up to 15 μm.

In another aspect of the present disclosure, the diametric beam $1/e^2$ waist and beam $1/e^2$ width are selected such that performance is not degraded despite an apparent radial core stream shift resulting from a shift of a focal point of the laser beam of up to 15 μm.

In another aspect of the present disclosure, the diametric beam $1/e^2$ waist is selected such that time of flight measurements are capable of distinguishing particle or cell size to within 1 μm given a flow rate variation through the flow cell of less than or equal to 2%.

BRIEF DESCRIPTION OF THE DRAWINGS

Various aspects and features of the presently disclosed flow cytometer and laser optics assembly thereof are described herein with reference to the drawings wherein like reference numerals identified similar or identical elements and:

FIGS. 15-17 are top view schematic diagrams of the module of FIG. 1 illustrating axial adjustment of the negative cylindrical lens of the laser optics assembly.

DETAILED DESCRIPTION

Figure 1:
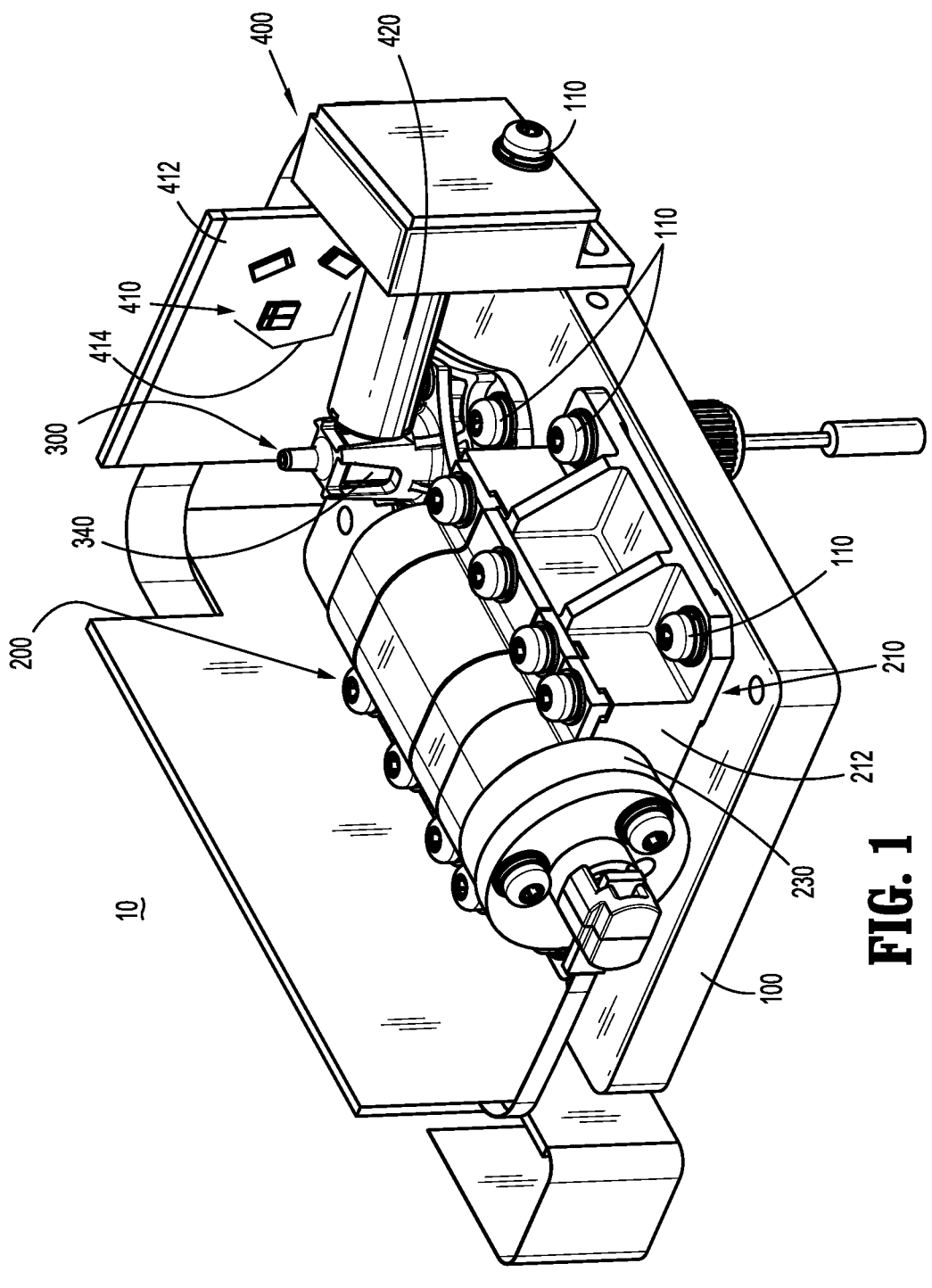
FIG. 1 is a perspective view of a laser optics, flow cell, and sensor module of a flow cytometer provided in accordance with the present disclosure.
Figure 2:
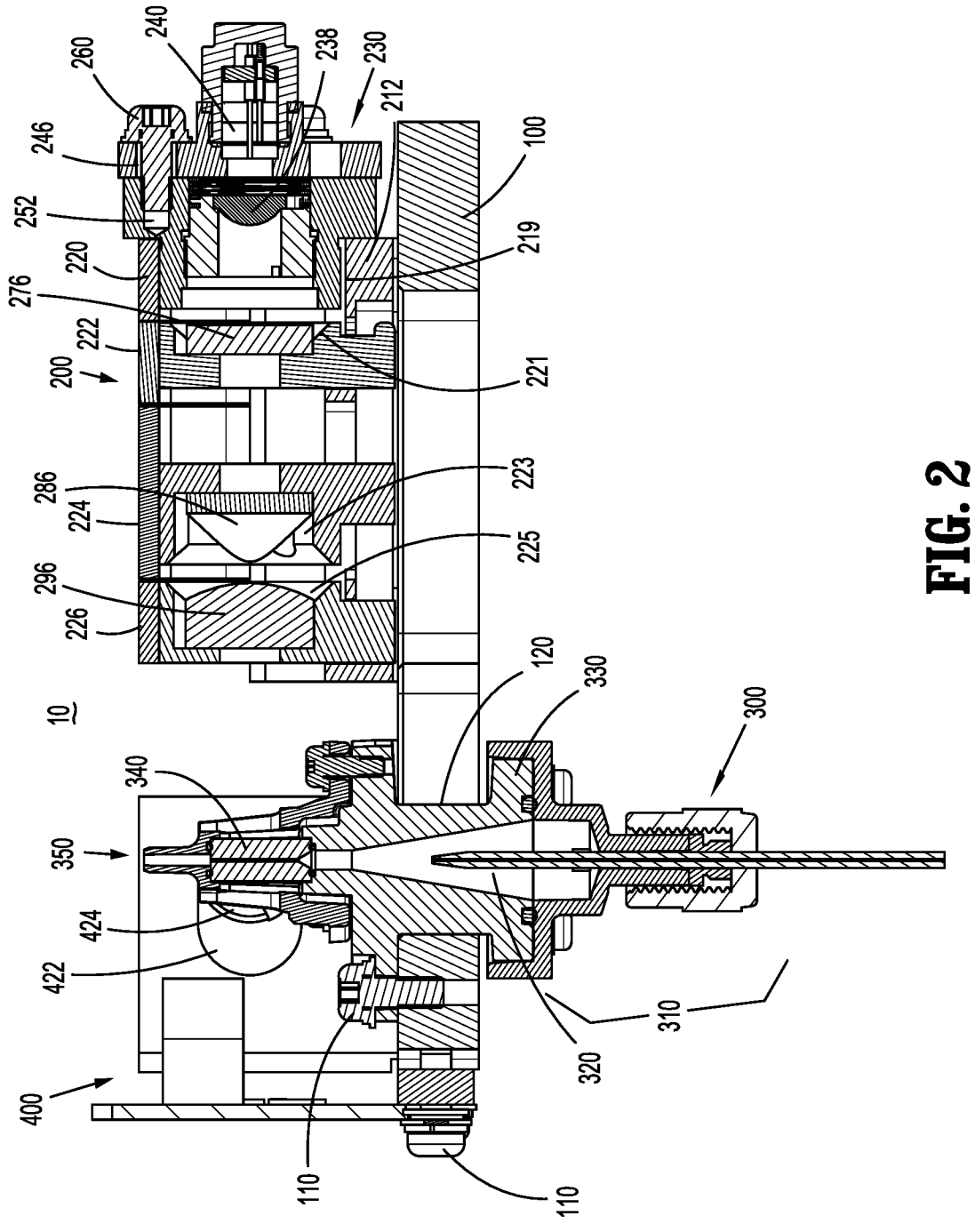
FIG. 2 is a longitudinal, cross-sectional view of the module of FIG. 1.
Figure 4:
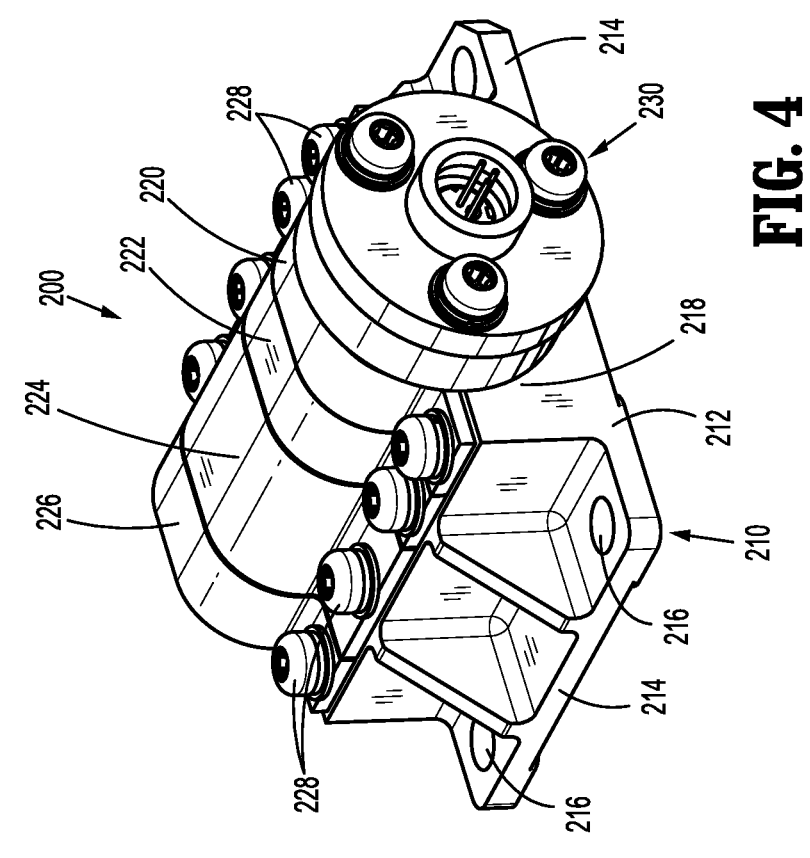
FIGS. 3 and 4 are respective front and rear perspective views of a laser optics assembly of the module of FIG. 1.
Figure 3:
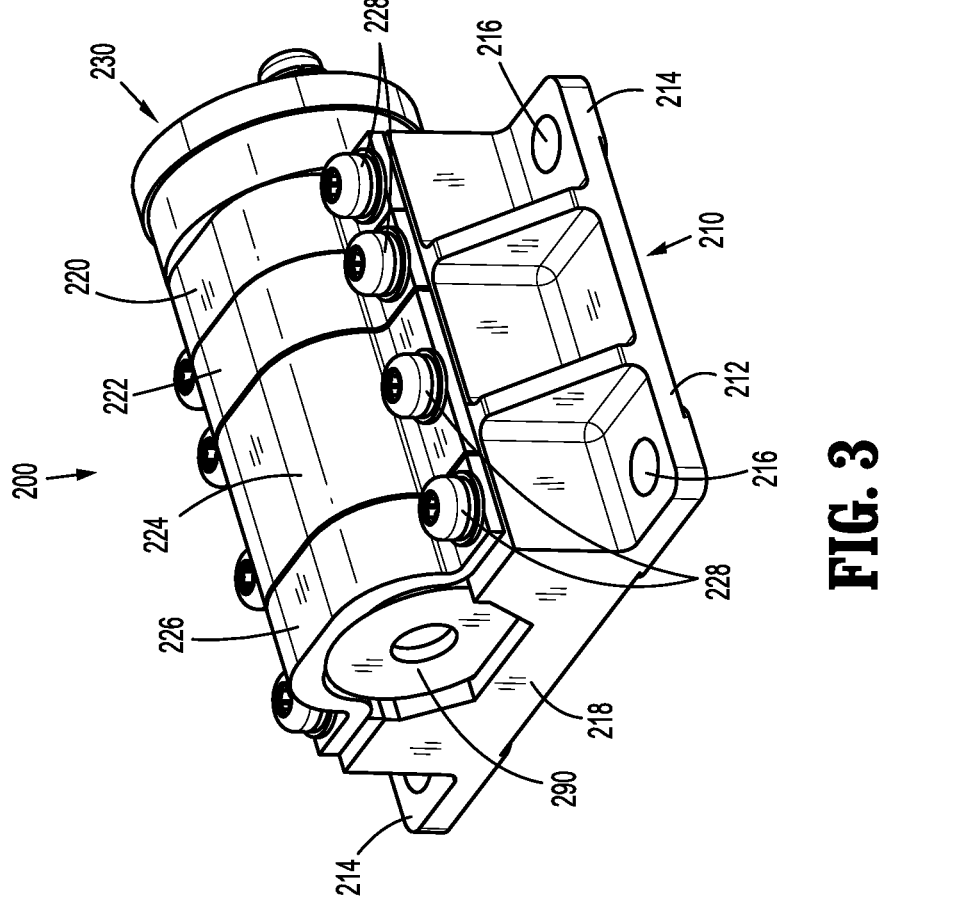
Figures 5, 6:
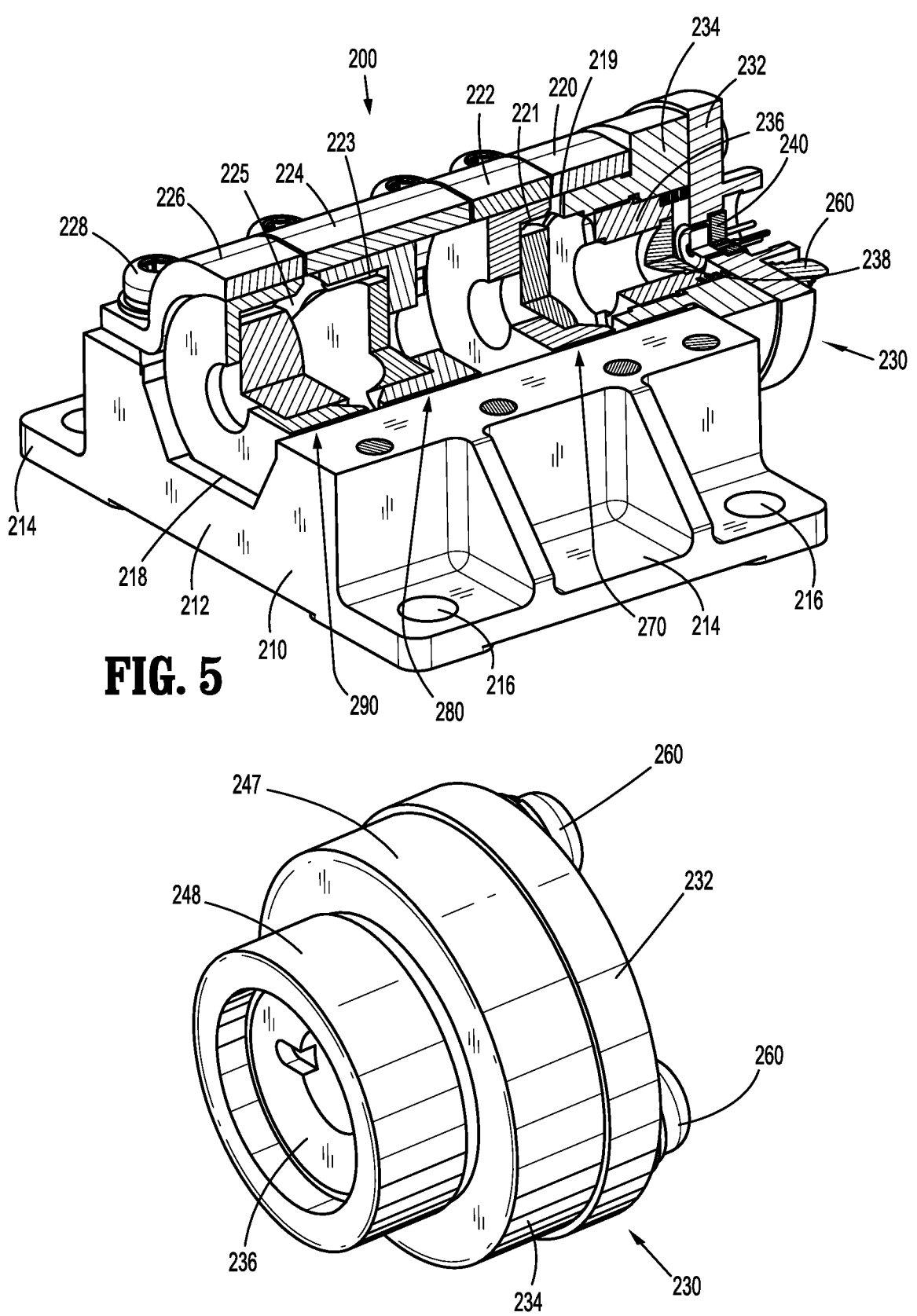
FIG. 5 is a perspective, partial cross-sectional view of the laser optics assembly of FIGS. 3 and 4.
FIGS. 6 and 7 are respective front and rear perspective views of a collimation sub-assembly of the laser optics assembly of FIGS. 3 and 4.
Figure 7:
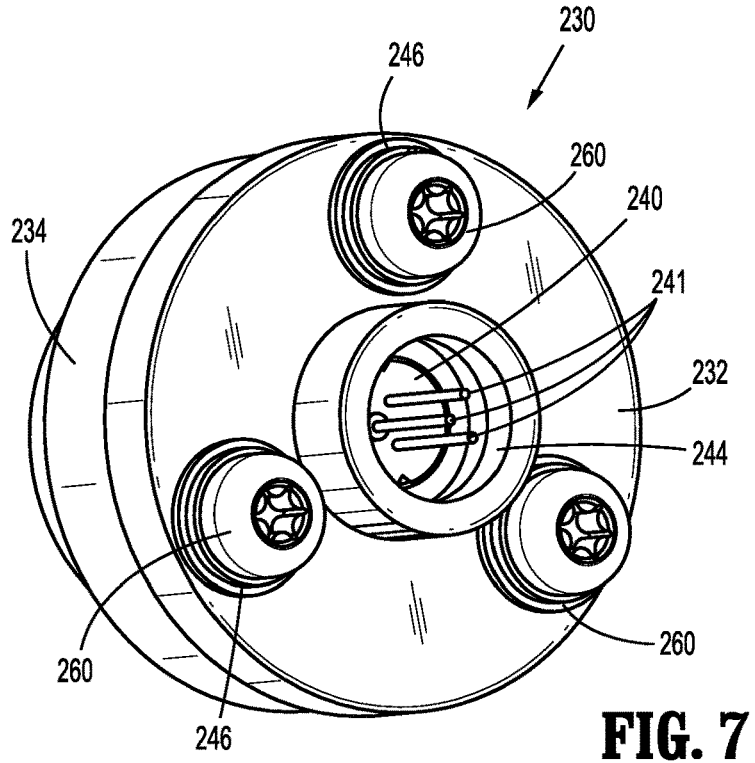
Figure 8:
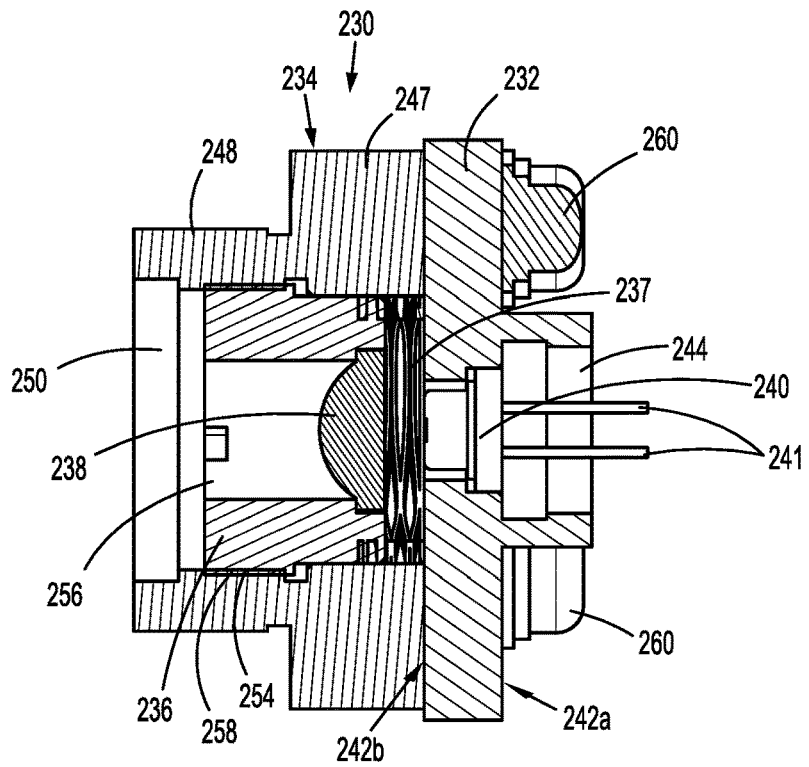
FIG. 8 is a longitudinal, cross-sectional view of the collimation sub-assembly of FIGS. 6 and 7.

Turning to FIGS. 1 and 2, the present disclosure provides a flow cytometer including a laser optics, flow cell, and sensor module shown generally identified by reference numeral 10. Although not shown, the flow cytometer may also include, for example, an outer housing enclosing the internal operable components of the flow cytometer, an electronics module configured to control module 10 and process test results received therefrom, a sample receiving module configured to receive a sample to be tested, a pump module configured to pump the sample and a sheath fluid into the flow cell assembly 300, and a waste module configured to enable safe collection of the sample and sheath fluid after testing. Alternatively or additionally, any other suitable modules, components, and/or features for use with module 10 of the flow cytometer of the present disclosure are also contemplated.

Continuing with reference to FIGS. 1 and 2, module 10 includes a mounting platform 100, a laser optics assembly 200 secured to mounting platform 100, a flow cell assembly 300 secured to mounting platform 100 and operably positioned relative to laser optics assembly 200, and a sensor assembly 400 operably positioned relative to laser optics assembly 200 and flow cell assembly 300 for both forward and side scatter detection. Laser optics assembly 200, flow cell assembly 300, and sensor assembly 400 are each independently fastened onto mounting platform 100 using bolts 110 and/or any other suitable fastening structures to maintain the relative positions of these assemblies 200-400.

As detailed below, module 10 is configured such that the flow cytometer is capable of operating over a wide temperature range such as, for example, 10° C. to 40° C., and to withstand 10 G's of random-axis vibration for 30 seconds without degradation of performance. Degradation of performance is defined herein as an intensity and/or sensitivity loss of greater than 5%.

In addition, as also detailed below, module 10 is configured such that the flow cytometer is: relatively insensitive to real or apparent core stream shifts of, for example, up to a 15 µm radial shift relative to the previously aligned flow axis of the core stream; operates without the need for a beam stopper to block non-scattered laser light from reaching the forward scattering sensors of sensor assembly 400; and employs a slowly converging beam along the axis perpendicular to core stream flow that permits the beam to be set at, in embodiments, a 1/e² width at the core stream.

Further still and, again, as detailed below, module 10 provides the flow cytometer with the ability to measure time-of-flight with a precision of 1 µm for particles in the range of 4 to 16 microns in diameter when the flow rate of the core stream is stable within 2%.

Referring to FIGS. 2-5, laser optics assembly 200 includes a clamp sub-assembly 210, a collimation sub-assembly 230, and a plurality of lens sub-assemblies 270, 280, 290. Clamp sub-assembly 210 includes a base plate 212 defining at least one pair, e.g., two pairs, of feet 214 along opposed side thereof that including apertures 216 defined therethrough to enable laser optics assembly 200 to be securely mounted onto mounting platform 100 using bolts 110. Base plate 212 further defines a generally cylindrical barrel 218 that extends along base plate 212 between feet 214. Barrel 218 defines first, second, third, and fourth chambers 219, 221, 223, and 225 aligned along a length of barrel 218. Chambers 219, 221, 223, and 225 are configured to receive collimation sub-assembly 230 and lens sub-assemblies 270, 280, 290, respectively, therein. Clamp sub-assembly 210 further includes cover plates 220, 222, 224, 226 configured to be securely mounted onto base plate 212 using bolts 228 to enclose and secure collimation sub-assembly 230 and lens sub-assemblies 270, 280, 290 within chambers 219, 221, 223, and 225, respectively, and relative to one another. The assembly of collimation sub-assembly 230 and lens sub-assemblies 270, 280, 290 within clamp sub-assembly 210, and the alignment thereof, is detailed below.

With reference to FIGS. 6-9, collimation sub-assembly 230 includes a support disc 232, a support hub 234, an insert 236, and a spring washer 237 that are configured to operably engage one another and retain a collimating lens 238 of collimation sub-assembly 230 in position relative to a laser diode 240 of collimation sub-assembly 230.

Support disc 232, more specifically, defines an outer face 242$a$ and an inner face 242$b$, and includes a central aperture 244 and a plurality of radial apertures 246 (FIG. 2) defined therethrough between the outer and inner faces 242$a$, 242$b$, respectively, thereof. Central aperture 244 defines an outer opening on the outer face side of support disc 232 that is greater than an inner opening of central aperture 244 defined on the inner face side of support disc 232 such that laser diode 240 may be inserted through the outer opening into central aperture 244 but is inhibited from passing though the inner opening. As such, laser diode 240 may be inserted through inner opening of central aperture 244 and seated therein to fix laser diode 240 relative to support disc 232. Laser diode 240 includes suitable electrical connectors 241 that enable connection thereof to power and control electronics (not shown). Laser diode 240 may be configured to emit red light having a wavelength in the range of 630-665 nm, or, in embodiments, in the range of 635-650 nm.

Support hub 234 defines a generally T-shaped configuration including a disc portion 247 positioned to abut inner face 242$b$ of support disc 232 and a body portion 248 extending from disc portion 247 in an opposite direction from support disc 232. A central lumen 250 extends through both disc portion 247 and body portion 248 and a plurality of radial bores 252 (FIG. 2) are defined within disc portion 247. Threading 254 is disposed on at least a portion of the internal surface of support hub 234 that defines lumen 250.

Insert 236 defines a generally cylindrical configuration defining an internal passage 256 therethrough. Insert 236 further includes threading 258 disposed on at least a portion of the external surface thereof that is configured to engage threading 254 of support hub 234. Insert 236, more specifically, is configured to retain collimating lens 238 within passage 256 thereof, e.g., using an adhesive, and is configured for positioning within central lumen 250 of support hub 234 in threaded engagement therewith. Spring washer 237 is configured for positioning within central lumen 250 between insert 236 and support disc 232 to maintain tension therebetween.

Continuing with reference to FIGS. 6-9, to assemble collimation sub-assembly 230, laser diode 240 is secured within support disc 232 and collimating lens 238 is secured within inset 236. Insert 236 is then threaded into engagement within central lumen 250 of support hub 234. With laser diode 240 secured within support disc 232 and insert 236 (securing collimating lens 238 therein) engaged within support hub 234, support disc 232 and support hub 234 are positioned relative to one another such that inner face 242b of support disc 232 abuts support hub 234, central aperture 244 of support disc 232 is aligned with central lumen 250 of support hub 234, and radial apertures 246 of support disc 232 are aligned with corresponding radial bores 252 of support hub 234 (see FIG. 2). A fixture (not shown) may be utilized to maintain support disc 232 and support hub 234 in this position and to facilitate alignment thereof, as detailed below.

With support disc 232 and support hub 234 positioned as detailed above, bolts 260 are inserted through radial apertures 246 and into engagement within radial bores 252, e.g., via threaded engagement, to secure support disc 232 and support hub 234 relative to one another (see FIG. 2). Position adjustments, e.g., vertical and/or horizontal adjustment, between support disc 232 and support hub 234 may be made before or after engagement of each bolt 260 via, for example, adjustment knobs (not shown) associated with the fixture, in order to align laser diode 240 relative to collimating lens 238 such that a beam emitted from laser diode 240 is both well-collimated and pointing in a direction co-axial with the optical axis of collimating lens 238. A reversed beam expander (not shown) associated with the fixture may also be utilized to verify this alignment.

In order to adjust the axial distance between collimating lens 238 and laser diode 240, insert 236 is threaded into or out of central lumen 250 of support hub 234, thereby moving collimating lens 238 towards or away from laser diode. The reversed beam expander (not shown) may again be utilized to ensure the prescribed axial distance between collimating lens 238 and laser diode 240 is achieved. With insert 236 threaded to the appropriate position, corresponding to the prescribed axial distance between collimating lens 238 and laser diode 240, spring washer 237 maintains tension between insert 236 and support disc 232, thus eliminating any play therebetween and ensuring the prescribed axial distance between collimating lens 238 and laser diode 240 is maintained despite, for example, mechanical vibrations applied to collimation sub-assembly 230.

Once the beam and optical axis of collimating lens 238 and laser diode 240, respectively, are coaxial with one another, and the beam is collimated, bolts 260 may be appropriately tightened to lock support disc 232 and support hub 234 relative to one another, thereby maintaining the engagement and positioning between support disc 232 and support hub 234 despite, for example, mechanical vibrations applied to collimation sub-assembly 230.

The above-detailed locking of support disc 232 and support hub 234 relative to one another fixes the horizontal, vertical, and axial alignment of collimating lens 238 and laser diode 240 relative to one another to ensure the above-noted alignment.

Referring still to FIGS. 6-9, collimation sub-assembly 230 is configured to maintain the prescribed axial distance between collimating lens 238 and laser diode 240 despite environmental temperature changes. More specifically, collimation sub-assembly 230 is configured to sufficiently maintain the prescribed axial distance between collimating lens 238 and laser diode 240 within a 30° C. range such as, for example, from 10° C. to 40° C., without performance degradation. This is accomplished by forming support hub 234 and insert 236 or, in embodiments, support disc 232, support hub 234, and insert 236, from materials having different coefficients of thermal expansion that maintain the prescribed axial distance between laser diode 240 and collimating lens 238 for the flow cytometer operating across the 10° C. to 40° C. range and, thus, do not degrade performance. In embodiments, this is accomplished by forming support hub 234 from brass (having a linear coefficient of thermal expansion of $1.8\times10^{-5}$) and insert 236 from PEEK (polyetheretherketone) (having a linear coefficient of thermal expansion of $4.5\times10^{-5}$), although other suitable materials having linear coefficients of thermal expansion that, in opposition, balance the response of the flow cytometer to temperature fluctuations in the 10° C. to 40° C. range are also contemplated. This balancing includes not only compensating for the linear coefficients of thermal expansion of some of the components of the flow cytometer, but also accounts for temperature-dependent changes in the refractive indices of the optical components of the flow cytometer. "Prescribed axial distance," as utilized herein, is understood to encompass a range of distances so as to take into account, for example, temperature-dependent changes in the target axial distance between collimating lens 238 and laser diode 240. This range may include variations from the prescribed axial distance between collimating lens 238 and laser diode 240 of no greater than 0.025% or, in embodiments, no greater than 0.012%.

With additional reference to FIGS. 2-5, in order to assemble collimation sub-assembly 230 with clamp sub-assembly 210, body portion 248 of support hub 234 of collimation sub-assembly 230 is seated within first chamber 219 of barrel 218 of base plate 212 of clamp sub-assembly 210 and, thereafter, cover plate 220 is positioned about body portion 248 of support hub 234 and engaged with base plate 212 on either side of support hub 234 via bolts 228 to enclose body portion 248 of support hub 234 within first chamber 219 and secure collimation sub-assembly 230 in position relative to base plate 212 under compression. In embodiments, collimation sub-assembly 230 is assembled with clamp sub-assembly 210 prior to assembly of lens sub-assemblies 270, 280, 290. Prior to tightening bolts 218, collimation subassembly 230 is rotated as necessary to ensure that the fast axis of the laser beam is aligned perpendicular to the bottom surface of base plate 212.

Figures 9, 10, 11:
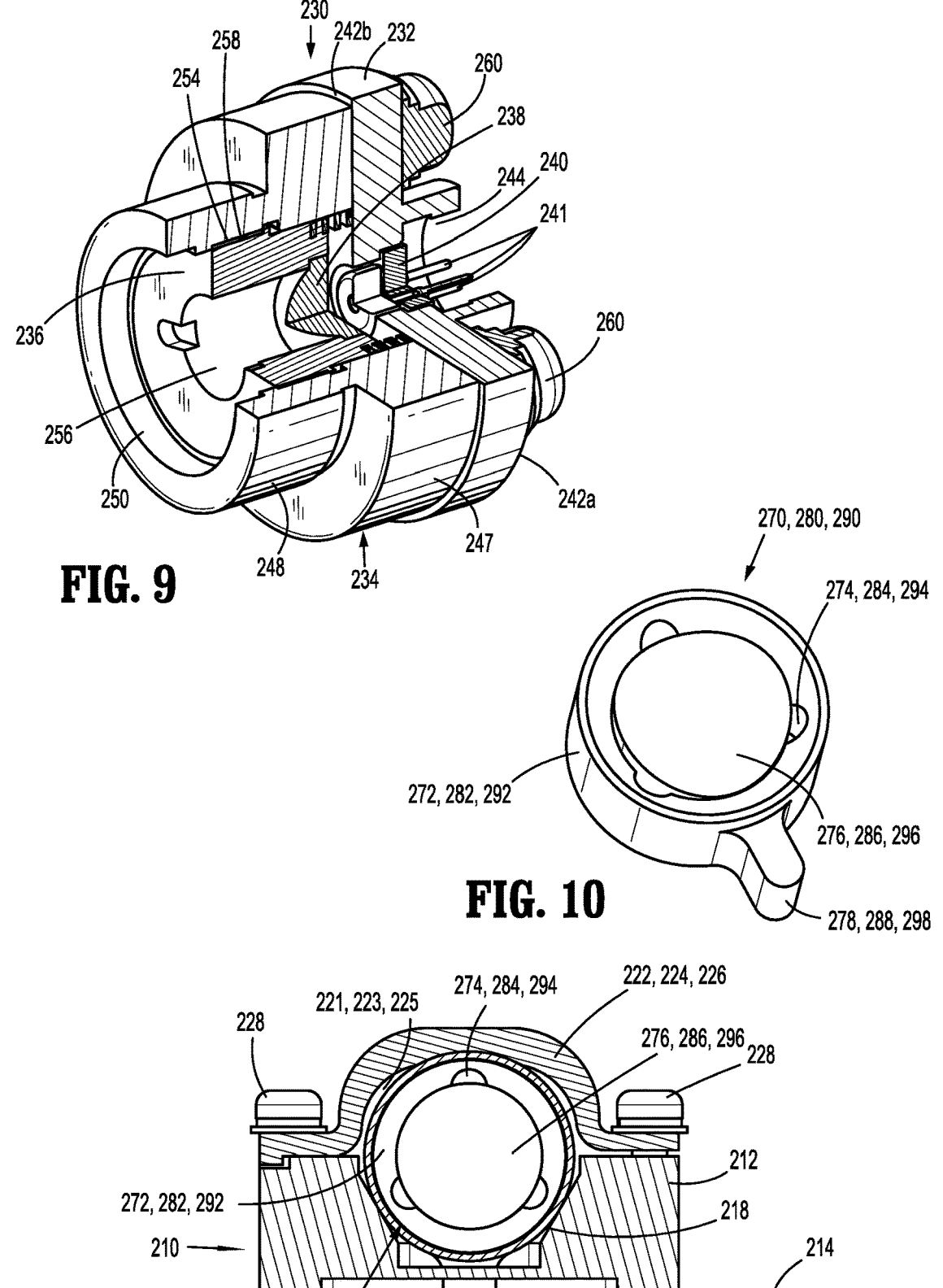
FIG. 9 is a perspective, partial cross-sectional view of the collimation sub-assembly of FIGS. 6 and 7.
FIG. 10 is a perspective view of a lens sub-assembly of the laser optics assembly of FIGS. 3 and 4.
FIG. 11 is a transverse, cross-sectional view of the laser optics assembly of FIGS. 3 and 4 illustrating the lens sub-assembly of FIG. 10.
Figures 12, 13, 14:
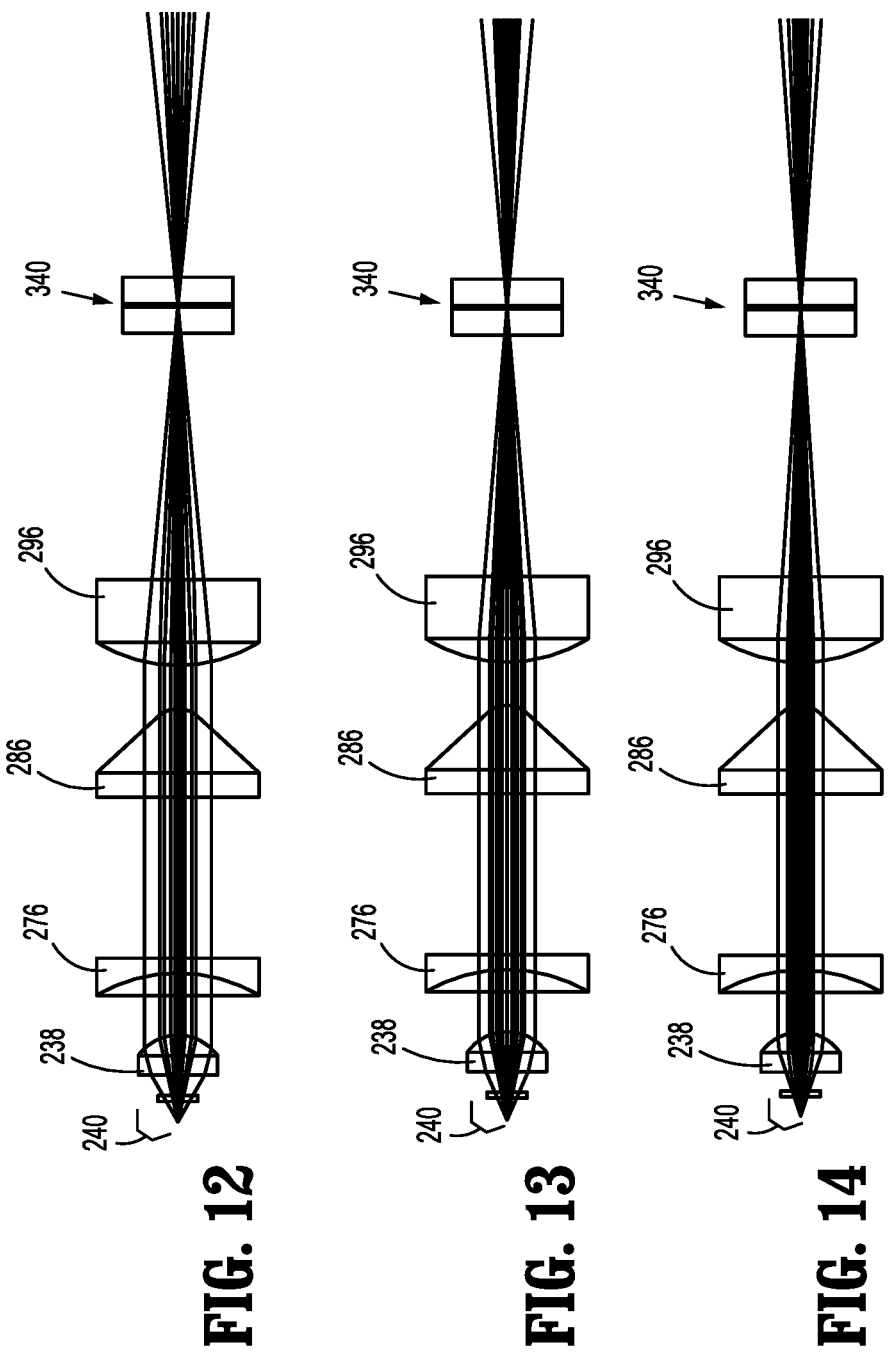
FIGS. 12-14 are side view schematic diagrams of the module of FIG. 1 illustrating axial adjustment of a negative cylindrical lens of the laser optics assembly.

Turning to FIGS. 10 and 11, in conjunction with FIGS. 2-5, as noted above, laser optics assembly 200 includes three lens sub-assemblies 270, 280, 290. Each lens sub-assembly 270, 280, 290 includes a lens cradle 272, 282, 292, respectively, defining a lens pocket 274, 284, 294, respectively, configured to fixedly retain a respective lens 276, 286, 296 therein. Lens 276 is configured as a positive cylindrical lens and, as part of lens-sub assembly 270, is configured to be positioned within second chamber 221 of barrel 218 of base plate 212 and secured therein via second cover plate 222 such that positive cylindrical lens 276 is positioned closest to collimation lens 238. Lens 286 is configured as a negative cylindrical lens and, as part of lens-sub assembly 280, is configured to be positioned within third chamber 223 of barrel 218 of base plate 212 and secured therein via third cover plate 224 such that negative cylindrical lens 286 is positioned next to positive cylindrical lens 276 on an opposite side thereof relative to collimation sub-assembly 230. Lens 296 is configured as a cylindrical objective lens and, as part of lens-sub assembly 290, is configured to be positioned within fourth chamber 225 of barrel 218 of base plate 212 and secured therein via fourth cover plate 226 such that cylindrical objective lens 296 is positioned next to negative cylindrical lens 286 on an opposite side thereof relative to positive cylindrical lens 276.

Each lens cradle 272, 282, 292 includes a finger 278, 288, 298 extending radially outwardly therefrom. Fingers 278, 288, 298 are configured to extend through slots (not explicitly shown) defined within base plate 212 adjacent chambers 221, 223, 225, respectively, such that fingers 278, 288, 298 extend from base plate 212 on an underside thereof.

To assemble lens sub-assemblies 270, 280, 290 within clamp sub-assembly 210, lenses 276, 286, 296 are engaged within pockets 274, 284, 294 of lens cradles 272, 282, 292, respectively, and lens cradles 272, 282, 292 are positioned within chambers 221, 223, 225, respectively. Cradles 272 and 292 define thicknesses that generally approximate the widths of chambers 221 and 225, respectively, and/or include complementary features to maintain cradles 272 and 292 and, thus, lenses 276 and 296, respectively, in fixed axial position within respective chambers 221 and 225 upon positioning therein. However, fingers 278 and 298 of lens cradles 272, 292 may be manipulated to rotate lens cradles 272, 292 and, thus, lenses 276 and 296, respectively, relative to base plate 212. Lens cradle 282, on the other hand, defines a reduced thickness relative to the width of chamber 223 such that cradle 282 and, thus, lens 286, may axially translate along barrel 218 upon corresponding manipulation of finger 288 of lens cradle 282. Finger 288 may also be manipulated to rotate lens cradle 282 and, thus, lens 286, relative to base plate 212. The above-detailed configuration enabling rotational alignment of lenses 276, 286, 296 and axial positioning of lens 286 is advantageous as these have been found to be important alignments to ensure accurate performance of the flow cytometer.

During assembly, once collimation sub-assembly 230 is installed, lens sub-assembly 290 is then inserted into chamber 225, rotationally adjusted using finger 298, and secured using cover plate 226 and bolts 228 to fix lens sub-assembly 290 in position relative to base plate 212 under compression. Base plate 212 is configured such that lens sub-assembly 290 is installed at a distance from collimating lens 238 approximately equal to the sum of the focal lengths of the lens 296 and collimating lens 238. Once lens sub-assembly 290 installed, as detailed above, a verification is conducted to ensure a beam waist $1/e^2$ diameter of 6.7 µm to 9 µm, in a direction parallel to a direction along which the core stream flows through flow cell 340 (see FIG. 2), has been achieved.

After the assembly and verification of lens sub-assembly 290, lens sub-assembly 270 is inserted into chamber 221, rotationally adjusted using finger 278, and secured using cover plate 222 and bolts 228 to fix lens sub-assembly 270 in position relative to base plate 212 under compression. Positive cylindrical lens 276 of lens sub-assembly 270 is rotationally aligned such that its axis of dioptric power is perpendicular to that of cylindrical objective lens 296, and this is verified by again confirming that the beam waist $1/e^2$ diameter of 6.7 µm to 9 µm, in the parallel to core stream flow direction, is maintained.

Next, lens sub-assembly 280 is inserted into chamber 223, rotationally and/or axially adjusted using finger 288, and secured using cover plate 224 and bolts 228 and to fix lens sub-assembly 280 in position relative to base plate 212 under compression. Negative cylindrical lens 286 of lens sub-assembly 280 is rotationally aligned so that its axis of dioptric power is perpendicular to that of cylindrical objective lens 296 and parallel to that of positive cylindrical lens 276, and this is verified by again confirming that the beam waist $1/e^2$ diameter of 6.7 µm to 9 µm, in the parallel to core stream flow direction, is maintained. The axial spacing of negative cylindrical lens 286 is adjusted in order to achieve a beam $1/e^2$ width of, in embodiments, 190 µm to 210 µm or, in embodiments, 200 µm, in a direction perpendicular to the direction the core stream flows through flow cell 340 (see FIG. 2).

Suitable fixturing (not shown) for retaining the various components and facilitating manipulation of fingers 278, 288, 298 to enable adjustment during assembly may be utilized, as may any suitable test equipment to measure beam width during the above-noted verifications. Once fully assembled and verified as detailed above, laser optics assembly 200 provides a beam waist $1/e^2$ diameter of 6.7 µm to 9 µm in the parallel direction and a $1/e^2$ beam width of 190 µm to 210 µm (or 200 µm) in the perpendicular direction.

Referring to FIGS. 12-17, FIGS. 12-14 show the divergence range of different laser diodes relative to the fast (more divergent) axis of the laser diode 240, which is set parallel to the core stream in flow cell 340 and, as stated previously, perpendicular to the bottom surface of the base plate 212. FIGS. 15-17 show the divergence range of different laser diodes relative to the slow (less divergent) axis of the laser diode 240, which is set perpendicular to the core stream in flow cell 340 and parallel to the bottom surface of the base plate 212. In one embodiment, laser diode 240 (e.g., a Ushio HL6363MG-A laser diode) will have a fast axis divergence greater than its slow axis divergence, but these two divergences are otherwise independent from one another.

The fast axis divergence of the laser diode 240 (parallel to the core stream in flow cell 340) governs the beam waist at the flow cell core stream in a well-aligned system. The most divergent beam from the laser diode (depicted in FIG. 12) provides the minimum beam waist, 6.7 µm, at the core stream and the least divergent beam (depicted in FIG. 14) laser diode provides the maximum beam waist, 9.0 µm, at the core stream. Again, in a well-aligned system, and regardless of the axial disposition of the negative cylindrical lens 286 within its adjustment range, the beam waist parallel to the core stream is maintained.

However, slight changes in the axial position of the negative cylindrical lens 286 allow adjustment of the $1/e^2$ width of the laser diode beam (perpendicular to core stream flow) within flow cell 340 to a range of 190 µm to 210 µm or, in embodiments, 200 µm. These axial position changes of a few hundred microns are not perceptible in FIGS. 15-17 but, in all three figures, the $1/e^2$ laser beam width is 200 µm perpendicular to and at the core stream center line. FIG. 15 depicts the most divergent slow axis laser beam, and FIG. 17 the least divergent slow axis laser beam. In FIG. 15, negative cylindrical lens 286 is located farthest from laser diode 240, while in FIG. 17, negative cylindrical lens 286 is located closest to laser diode 240. Note also that the slow axis axial focus position varies with different slow axis divergences and negative cylindrical lens 286 placements; the slow axis focus is closest to laser diode 240 in FIG. 15 and farthest from laser diode 240 in FIG. 17.

As detailed below, laser optics assembly 200, having such a beam $1/e^2$ diameter in the direction perpendicular to the flow of the core stream through flow cell 340 (FIG. 2), is advantageously insensitive to radial core stream shifts (real or apparent) within a 15 μm radius and, thus, radial core stream shifts (real or apparent) within a 15 μm radius do not result in degradation of performance.

Turning back to FIGS. 1-5, the above-detailed assembly of laser optics assembly 200 not only facilitates assembly and alignment, but also provides a configuration wherein collimation sub-assembly 230 and lens sub-assemblies 270-290 are individually and independently secured to base plate 212. This configuration of laser optics assembly 200 has shown the ability to withstand 10 G's of random-axis vibration for 30 seconds without more than a 5% change in a beam waist $1/e^2$ diameter of the laser optics assembly 200. More specifically, vibration testing was performed with a Qualmark OVTT™ 18 Omni-Axial Vibration Table Top System, available from ESPEC North America Inc. of Denver, Colorado, USA. Vibration tests were carried out by securing laser optics assembly 200 onto the vibration table and setting the table to 10 G's of random-axis mechanical vibration for at least 30 seconds. Acceleration was verified with an Omega™ HHVB82 Accelerometer, available from Omega Engineering, Inc. of Norwalk, Connecticut, USA.

Referring to FIGS. 1 and 2, as noted above, flow cell assembly 300 is mounted on mounting platform 100. Flow cell assembly 300, more specifically, includes an input 310 coupled to a nozzle 320 defined by a housing 330 for delivering the sample and sheath fluid to nozzle 320, a flow cell 340 connected downstream of nozzle 320 to receive the sample and sheath (not shown) fluid therefrom, and an output 350 disposed downstream of flow cell 340 to direct the sample and sheath fluid to a suitable collection reservoir after testing. Housing 330 of flow cell assembly 300 is seated within an aperture 120 defined through mounting platform 100 and is fixedly secured to mounting platform 100 using a plurality of bolts 110 to maintain a prescribed distance between flow cell 340 and cylindrical objective lens 296, which is an important distance to control to ensure accuracy of the flow cytometer.

Housing 330 of flow cell assembly 300 and mounting platform 100 are configured to sufficiently maintain the prescribed distance between flow cell 340 and cylindrical objective lens 296 within a 30° C. range such as, for example, from 10° C. to 40° C., without performance degradation. This is accomplished by forming housing 330 of flow cell assembly 300 and mounting platform 100 from materials having different linear coefficients of thermal expansion, configured to maintain a prescribed axial distance between the objective lens 296 and the flow cell 340 across the 10° C. to 40° C. range. In embodiments, this is accomplished by forming housing 330, which comes in direct contact with the sample, e.g., blood, and sheath fluid and, thus, must also be suitable for such purpose, from Eastman Tritan™ Copolyester MX811 (having a linear coefficient of thermal expansion of $8.0 \times 10^{-5}$), available from Eastman Chemical Company of Kingsport, Tennessee, USA, and forming mounting platform 100 from aluminum (having a linear coefficient of thermal expansion of $2.38 \times 10^{-5}$), although other suitable material combinations having linear coefficients of thermal expansion that, in opposition, balance the response of the flow cytometer to temperature fluctuations in the 10° C. to 40° C. range are also contemplated. This balancing includes not only compensating for the linear coefficients of thermal expansion of some of the components of the flow cytometer, but also accounts for temperature-dependent changes in the refractive indices of the optical components of flow cytometer 10. Similarly as above, "prescribed axial distance" is understood to encompass a range of distances so as to take into account, for example, temperature-dependent changes in the target axial distance between the objective lens 296 and the flow cell 340. This range may include variations from the prescribed axial distance between the objective lens 296 and the flow cell 340 of no greater than 0.01% or, in embodiments, no greater than 0.005%.

With flow cell assembly 300 mounted on mounting platform 100, the face of flow cell 340 is not oriented parallel to the planar face of cylindrical objective lens 296 but, rather, is offset an angle of 5° in order to ensure that any specular reflections from it do not couple back into the laser optics. Flow cell 340 is also coated with an anti-reflection coating for similar purposes.

Continuing with reference to FIGS. 1 and 2, sensor assembly 400 includes a forward scatter sub-assembly 410 and a side scatter sub-assembly 420. Forward scatter sub-assembly 410 includes a board 412 and a sensor array 414 including an extinction sensor, a forward scatter low angle sensor, and a forward scatter high angle sensor. Side scatter sub-assembly 420 includes a lens mount 422 (FIG. 2), a lens 424 (FIG. 2) supported within the lens mount 422 (FIG. 2), and a side scatter sensor (not shown). The center capture angle of side scatter sub-assembly 420 is 78° from the laser beam direction, instead of a right angle (i.e., 90°), to increase the side-scattering signal.

Referring generally to FIGS. 1-2, the insensitivity of module 10 to radial core stream shifts (real or apparent) within a 15 μm radius, noted above, is described in more detail below. As is traditional, a Cartesian coordinate system is defined wherein the core stream flows in the positive y-axis direction and the laser beam flux points in the positive z-axis direction. By controlling the beam waist $1/e^2$ diameter along the y-axis, and also the beam $1/e^2$ diameter along the x-axis, it is possible to set elliptical areas within which the maximum intensity of the laser beam does not decrease more than a defined amount. As detailed below, module 10 is configured to remain insensitive to radial core stream shifts (real or apparent) within a 15 μm radius, thus maintaining performance (a decrease in intensity of equal to or less than 5%) despite such radial core stream shifts.

The laser beam from laser optics assembly 200 is aligned to the core stream flowing through flow cell 340 of flow cell assembly 300 while the scattered laser light, coming from particles flowing in it, are monitored and converted into electrical signals. The relative position of laser optics assembly 200 and flow cell 340 are adjusted in the x- and z-directions in order to maximize these signals. Prior to completion of this x- and z-axis alignment, the sensors of sensor assembly 400 are aligned horizontally to the laser beam; no further alignment in the y-direction is required.

The flow cytometer of the present disclosure makes measurements based on either the maximum scattering signal or the maximum area under the profile of the scattering signal and, thus, the y-direction beam waist need not be considered except for its effect on the intensity of the laser beam as a function of distance along the z-axis. In the z-direction, the relative intensity is defined in equation (1):

$$\frac{I_z}{I_{0,z}} = \left(1 + \left(\frac{z}{z_R}\right)^2\right)^{-\frac{1}{2}}$$

where $I_{0,z}$ is the intensity at z=0 (the location of the beam waist, aligned to the center of the core stream), and the z position and Rayleigh range $z_R$ are defined in micrometers (μm). By definition, then, equation (2) is provided:

$$z_R = \frac{\pi \omega_{0,y}^2}{4\lambda M^2}$$

where the y-direction beam waist $1/e^2$ diameter is $\omega_{0,y}$, defined in μm, $\lambda$=0.64 μm for the nominal laser wavelength, and beam quality factor, $M^2$=1.2.

The x-direction beam $1/e^2$ diameter being relatively large (e.g., 190 μm to 210 μm), minimizes the effect on the laser beam intensity as a function of distance along the z-axis. However, the x-direction beam diameter does affect how much beam intensity is available to be scattered, if the core stream shifts along the x-axis from its aligned position. In the x-direction, the relative intensity is defined in equation (3):

$$\frac{I_x}{I_{0,x}} = e^{-8\left(\frac{x}{\omega_x}\right)^2}$$

where, similar to Equations (1) and (2), $I_{0,x}$ is the intensity at x=0 (again, the center of the beam diameter, aligned to the center of the core stream), and the x position and x-direction beam $1/e^2$ diameter co are defined in μm.

The product of Equations (1) and (3), for given beam waist $1/e^2$ diameter $\omega_{0,y}$ and beam $1/e^2$ diameter $\omega_x$, can be solved for combinations of x and z positions that describe the outer limits of a beam intensity decrease of a considered value, such as 5%. For example, equation (4):

$$0.95 = \frac{I_x * I_z}{I_0^2}$$

Since the beam diameters are defined along orthogonal axes that are equivalent to the coordinate axes, equation (5) holds true:

$$I_0 = I_{0,x} = I_{0,x}$$

According to the above, the beam diameters are selected to ensure that at a radial core stream shift of up to 15 μm, relative to the y-axis, the intensity at that shifted center is maintained within 5% of the original center, to which the system was aligned. These core stream shifts can be real (in the case that the core stream moves radially from its original center) or apparent (in the case that the focal point of the laser optics changes due to shifts in one or more components).

Taking into account the above, and also considering that the x-direction extent of the beam $1/e^2$ diameter can be limited to mitigate reflections off of the internal edges of flow cell 340, the 190 μm to 210 μm (or 200 μm) x-direction beam $1/e^2$ diameter is selected. Taking into account the above and also considering that the y-direction extent of the beam waist $1/e^2$ diameter can be limited to increase the ability to make relevant Time-of-Flight (TOF) measurements, as detailed below, the 6.7 μm to 9 μm y-direction beam waist $1/e^2$ diameter is selected.

Another important consideration for both beam diameter components (x-axis and y-axis) is that a wider beam diameter spreads the laser power over a larger area. In fact, the beam intensity along a given axis is inversely proportional to its beam diameter along that same axis. Module 10 balances the above-detailed constraints by providing the 190 μm to 210 μm (or 200 μm) x-direction beam $1/e^2$ diameter and the 6.7 μm to 9 μm y-direction beam waist $1/e^2$ diameter. Thus, a large area within which the core stream may actually or apparently shift is achieved, while the contributions of stray light scattering off flow cell 340 side walls are mitigated. In addition, these balanced constraints allow for precise TOF measurements, as detailed below, and minimize the laser power requirements of module 10.

With respect to TOF measurement, as a cell or particle flows through flow cell 340, it first encounters increasing laser intensity, until the cell or particle is coincident with the maximum laser intensity, and then the particle encounters decreasing laser intensity. Accordingly, as a general approximation, the scattering intensity from a given particle or cell is proportional to the overlap volume between the incremental laser beam intensity and the particle's cross-sectional, incremental volume. Thus, by considering how spherical particles of a range of diameters overlap with the laser beam, relative, scaled widths of the different particle overlaps can be compared. And, as long as the cell flow rates remain consistent, TOF will scale accordingly.

Based on the above, and utilizing full-width-at-half-maximum (FWHM) changes estimated as the maximum proportional change in the scattering intensity curve width, for a given particle or cell, it can be determined what y-axis beam widths will still allow that particle's or cell's diameter to be classified within ±1 μm of its actual diameter, to approximately a 95% confidence level. However, flow rate variability limits the ability to accurately determine a particle's or cell's diameter and, thus, must be taken into account.

Utilizing the 6.7 μm to 9 μm y-direction beam waist $1/e^2$ diameter and controlling flow rate variability to within approximately 2% from the mean, as is provided by the presently-disclosed flow cytometer, enables TOF discrimination between particles or cells (of between 4 and 16 μm in diameter) having diameters differing by at least ±1 μm. Furthermore, periodic flow rate variability may be compensated, for example, using a pressure sensor to detect flow rate variability and, based thereupon, correcting for variations in pulsatile flow (from the pump module pumping the sample and sheath fluid through flow cell 340).

It is understood that reference to any specific numerical value herein encompasses a range of values to take into account material and manufacturing tolerances generally accepted in the art and/or margins of error of measurement equipment generally accepted in the art.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. A flow cytometer, comprising:
a flow cell defining a flow direction;
a collimation assembly including laser diode and a collimating lens configured to produce a laser beam along an axis;
a positive cylindrical lens disposed on the axis downstream from the collimation assembly;
a negative cylindrical lens disposed on the axis downstream from the positive cylindrical lens;
a cylindrical objective lens disposed on the axis downstream from the negative cylindrical lens and configured to project the laser beam onto the flow cell such that the laser beam incident on the flow cell defines a diametric beam $1/e^2$ waist in a direction parallel to the flow direction of the flow cell, wherein the diametric beam $1/e^2$ waist is 6.7 μm to 9 μm, and a beam $1/e^2$ width in a direction perpendicular to the flow direction of the flow cell, wherein the beam $1/e^2$ width is up to 210 μm; and
at least one forward scatter sensor configured to detect an intensity of forward scattered light from the flow cell without a beam stopper disposed between the flow cell and the at least one forward scatter sensor.

2. The flow cytometer according to claim 1, wherein the collimation assembly, the positive cylindrical lens, the negative cylindrical lens, and the cylindrical objective lens are cooperatively configured such that performance is not degraded despite at least one of an actual radial core stream shift within the flow cell of up to 15 μm or an apparent radial core stream shift resulting from a shift of a focal point of the laser beam of up to 15 μm.

3. The flow cytometer according to claim 1, wherein the collimation assembly, the positive cylindrical lens, the negative cylindrical lens, and the cylindrical objective lens are cooperatively configured to enable time of flight measurements to be made that are capable of distinguishing particle or cell size to within 1 μm given a flow rate variation through the flow cell of less than or equal to 2%.

4. The flow cytometer according to claim 1, further comprising a barrel, wherein each of the collimation assembly, the positive cylindrical lens, the negative cylindrical lens, and the cylindrical objective lens are at least partially disposed within the barrel.

5. The flow cytometer according to claim 4, wherein at least one cover plate secures the collimation assembly, the positive cylindrical lens, the negative cylindrical lens, and the cylindrical objective lens within the barrel.

6. The flow cytometer according to claim 4, wherein the barrel defines a first chamber configured to at least partially receive the collimation assembly, a second chamber configured to at least partially receive the positive cylindrical lens, a third chamber configured to at least partially receive the negative cylindrical lens, and a fourth chamber configured to at least partially receive the cylindrical objective lens.

7. The flow cytometer according to claim 6, wherein the positive cylindrical lens, the negative cylindrical lens, and the cylindrical objective lens are secured within respective first, second, and third lens cradles, and wherein the first, second, and third lens cradles are at least partially disposed within the second, third, and fourth chambers of the barrel, respectively.

8. The flow cytometer according to claim 7, wherein at least one of the first, second, or third lens cradles includes a finger extending therefrom configured to permit at least one of longitudinal movement along an optical axis or rotational adjustment of the lens cradle within the corresponding chamber during assembly.

9. A flow cytometer, comprising:
a flow cell defining a flow direction;
a collimation assembly including laser diode and a collimating lens configured to produce a laser beam along an axis; and
a plurality of lenses disposed on the axis, the plurality of lenses cooperating to project the laser beam onto the flow cell such that the laser beam incident on the flow cell defines a diametric beam $1/e^2$ waist in a direction parallel to the flow direction of the flow cell of 6.7 μm to 9 μm and a beam $1/e^2$ width in a direction perpendicular to the flow direction of the flow cell of up to 210 μm, and such that the laser beam converges towards the flow cell more slowly in the direction perpendicular to the flow direction relative to convergence of the laser beam towards the flow cell in the direction parallel to the flow direction.

10. The flow cytometer according to claim 9, wherein the collimation assembly and the plurality of lenses are cooperatively configured such that performance is not degraded despite an actual radial core stream shift within the flow cell of up to 15 μm.

11. The flow cytometer according to claim 9, wherein the collimation assembly and the plurality of lenses are cooperatively configured such that performance is not degraded despite an apparent radial core stream shift resulting from a shift of a focal point of the laser beam of up to 15 μm.

12. The flow cytometer according to claim 9, wherein the collimation assembly and the plurality of lenses are cooperatively configured to enable time of flight measurements to be made that are capable of distinguishing particle or cell size to within 1 μm given a flow rate variation through the flow cell of less than or equal to 2%.

13. The flow cytometer according to claim 9, wherein the plurality of lenses includes a positive cylindrical lens, a negative cylindrical lens, and a cylindrical objective lens.

14. The flow cytometer according to claim 9, further comprising a barrel, wherein the collimation assembly and the plurality of lenses are at least partially disposed within the barrel.

15. The flow cytometer according to claim 14, wherein at least one cover plate secures the collimation assembly and the plurality of lenses within the barrel.

16. The flow cytometer according to claim 14, wherein the barrel defines a first chamber configured to at least partially receive the collimation assembly and a plurality of additional chambers configured to at least partially receive respective ones of the plurality of lenses.

17. The flow cytometer according to claim 16, wherein the plurality of lenses are secured within respective ones of a plurality of lens cradles, and wherein the plurality of lens cradles are at least partially disposed within respective ones of the plurality of additional chambers.

18. The flow cytometer according to claim 17, wherein at least one lens cradle of the plurality of lens cradles includes a finger extending therefrom configured to permit at least one of longitudinal movement along an optical axis or rotational adjustment.

* * * * *